A. G. RITZ.
Car Coupling.

No. 85,767.

Patented Jan. 12, 1869.

Witnesses.
Saml. F. Estell.
A. S. Dalbey.

Inventor.
Adam G. Ritz
by Joseph Ridge
his atty.

UNITED STATES PATENT OFFICE.

ADAM G. RITZ, OF ELIZABETHTOWN, ASSIGNOR TO HIMSELF AND JOHN B. CARTER, OF HARTSVILLE, INDIANA.

Letters Patent No. 85,767, dated January 12, 1869.

IMPROVED CAR-COUPLING.

The Schedule referred to in these Letters Patent and making part of the same.

To all whom it may concern:

Be it known that I, ADAM G. RITZ, of Elizabethtown, in the county of Bartholomew, and State of Indiana, have invented a new and useful Improvement in Car-Couplings; and I do hereby declare that the following is a full and exact description thereof, reference being had to the accompanying drawings, making a part of this specification, in which—

The same letters in the different figures relate to corresponding parts.

To enable others skilled in the art to make and use my invention, I will proceed to describe the same.

The draw-heads or buffers A A are attached to the cars in the usual manner.

$c$ represents the connecting-link, and $d$, the coupling-pin.

$e$ represents an apron hinged at the rear of the cavity in the draw-head, its front end being curved downward, conforming to the rounded shape of the front of the cavity.

$J$ represents an adjusting-hook for raising hinged apron $e$.

$b$ represents an adjusting-bar for supporting coupling-pin $d$, the latter resting in a perforation through the enlarged horizontal end of said bar.

Figure 1:
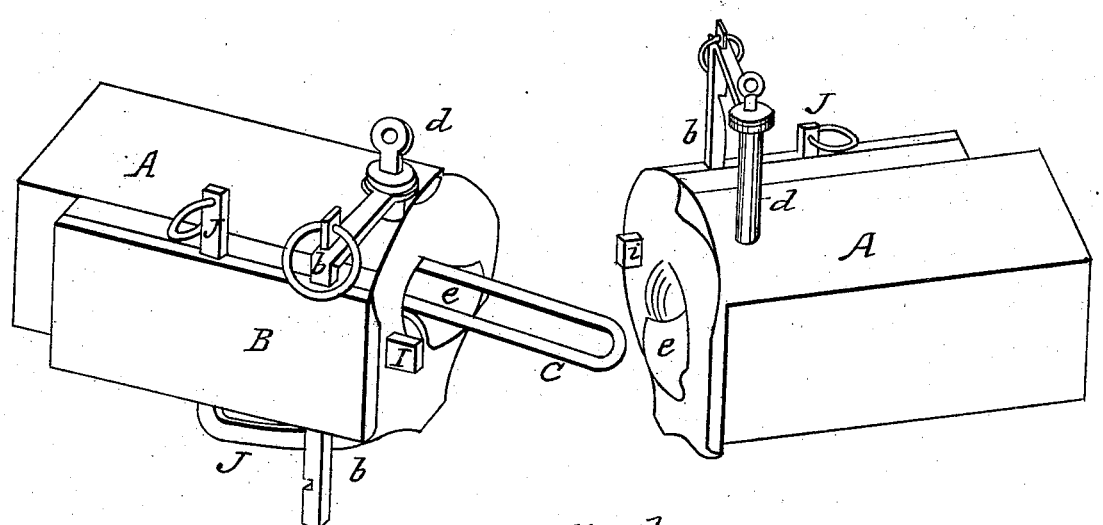
Figure 1 is a perspective view of two draw-heads with the mechanism adjusted for coupling.
Figure 2:
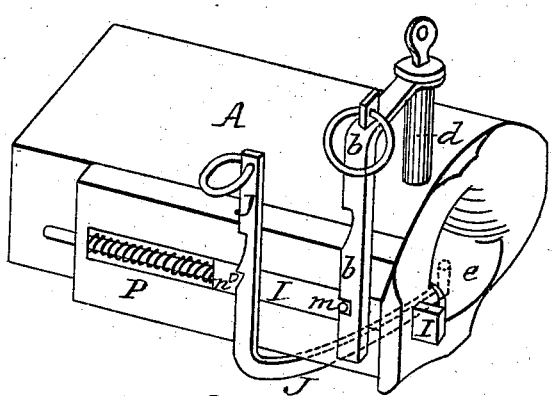
Figure 2 represents a draw-head with a section removed, showing the adjusting-devices.

$I$ represents a sliding bar, situated in a suitable recess in the side of the draw-head, with one end projecting in front, as shown in fig. 2.

The slide $I$ is pressed outward by means of spiral spring $P$.

The side devices are covered by plate B, the latter being provided with suitable vertical mortises or recesses for the accommodation of hook $J$ and bar $b$, in which the latter have vertical play.

The hook $J$, as shown by dotted lines, fig. 2, extends underneath the draw-head, with a right-angular termination projecting upward through an aperture in the under side of the draw-head and beneath apron $e$.

The hook $J$ and bar $b$ are provided with rings at their tops, for the purpose of affording a convenient hold in lifting said hook and bar.

$m$ and $n$ are pins or catches projecting from slide $I$.

The devices are adjusted for coupling by raising the bar $b$ in the draw-head not having the link, thus raising the coupling-pin to a position that will permit the link in the opposite draw-head to enter.

The vertical portion of bar $b$ is provided with notches, into one of which pin $m$ catches, thus supporting the bar, and with it coupling-pin $d$, when they are raised for the purpose of coupling.

The link $c$ is raised to any required position for entering the draw head of another car, by means of hook $J$, (which, when lifted, raises apron $e$, and consequently link $c$,) where it is supported by pin $n$ catching a notch in bar $J$.

The coupling-devices being thus adjusted, the cars are brought together, when the compression resulting from the contact of the two draw-heads forces in the slides $I$ and $I$, thus releasing bar $b$ and hook $J$, and allowing them to drop simultaneously, by which automatic operation coupling-pin $d$ is allowed to drop in its place and secure the link, and apron $e$ is made to resume its proper position at the bottom of the cavity, thus effecting the operation of coupling in a very convenient manner, and without the usual danger.

Having thus fully described my said invention,

What I claim, and desire to secure by Letters Patent, is—

The combination of the apron $e$, hook $J$, spring-slide $I$, and bar $b$, all constructed and arranged substantially as described, and for the purpose set forth.

ADAM G. RITZ.

Witnesses:
K. DU BOIS HAWLEY,
N. G. FRANCIS.